Figure 1:
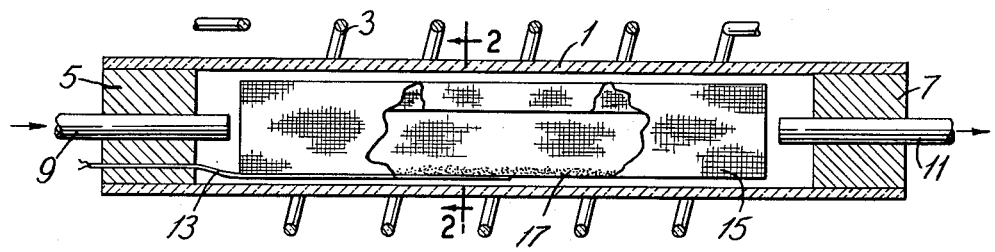

Aug. 11, 1964

W. J. ALLAN ETAL 3,144,358

PROCESS FOR PRODUCTION OF LONG METALLIC WHISKERS
USING A POLYCRYSTALLINE COPPER SUBSTRATE

Filed March 2, 1961

INVENTORS
WILLIAM J. ALLAN
WATT W. WEBB

BY Thomas L. O'Brien
ATTORNEY

United States Patent Office 3,144,358
Patented Aug. 11, 1964

3,144,358
PROCESS FOR PRODUCTION OF LONG METALLIC WHISKERS USING A POLYCRYSTALLINE COPPER SUBSTRATE
William J. Allan, Niagara Falls, Ontario, Canada, and Watt W. Webb, Lewiston, N.Y., assignors to Union Carbide Corporation, a corporation of New York
Filed Mar. 2, 1961, Ser. No. 92,961
4 Claims. (Cl. 148—1.6)

The present invention relates to high strength filamentary single metal crystals and more particularly to a process for the production of such metal crystals from their volatile chlorides.

In previously known vapor-phase processes for the production of single crystals from metallic chlorides, it has been observed that the metallic crystals which were thereby produced were vigorously attacked by the products of the reaction, notably HCl, and for this reason a substantial yield of relatively large crystals was seldom, if ever, attained.

It is therefore an object of the present invention to provide a process for the production of substantial quantities of relatively large high strength filamentary single crystals of metals of Groups IB and VIII from their respective metal chlorides.

It is another object of the present invention to provide a process for the production of relatively large high strength filamentary copper crystals.

Figure 2:
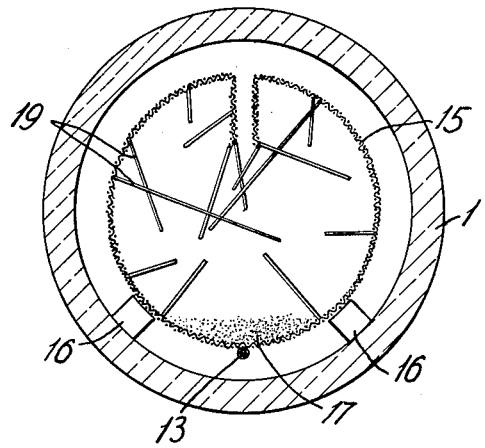

Other objects will be apparent from the following description and claims taken in conjunction with the drawing in which:

FIGURE 1 shows apparatus especially suited to the process of the present invention, and FIGURE 2 is a sectional view along 2—2 of FIGURE 1.

A process in accordance with the present invention for the production of high strength filamentary single crystals of a metal selected from Groups IB and VIII comprises providing a chloride vapor corresponding to the metal to be produced in a hydrogen atmosphere at about atmospheric pressure and contacting a relatively large area of polycrystalline copper with the resultant vapor mixture. The large area of polycrystalline copper serves as a substrate upon which large filamentary single crystals having nearly theoretical strength are grown. Whisker-like crystals produced in accordance with the present invention have a length greater than about one-half inch with a substantial portion of the produced whiskers having a length of one inch or more.

The process of the present invention may be more readily understood by referring to the drawing which shows apparatus for the production of long metallic copper whiskers, i.e., filamentary, single crystals, in accordance with the present invention. Although the illustrated apparatus and the following description relate particularly to the production of long copper whiskers, it is to be understood that the process of the present invention contemplates the production of long metallic whiskers of other metals of Group IB and VIII having volatile chlorides, e.g., silver, iron, nickel and cobalt.

With reference to FIGURES 1 and 2, a conventional tube furnace is shown having a hard glass or ceramic tube 1 and an electrical heating element 3 surrounding the tube. Suitable closures 5 and 7 establish a gas tight seal with the tube 1 and are provided with conduits 9 and 11 respectively, through which a gas stream can be passed through the tube 1. In addition a thermocouple 13 is inserted through closure member 5 to provide an operating temperature-sensing means within the tube furnace.

In the process of the present invention for the production of long copper whiskers, a quantity of CuCl 17 is placed upon copper wire mesh 15, which is of generally cylindrical shape and located within and substantially coextensive with tube 1.

It has been found to be convenient in the practice of the present invention to first prepare an alcohol slurry of the chloride, and then spread this slurry over the mesh, subsequently evaporating the alcohol before placing the mesh in the tube furnace. When the chloride has been suitably disposed within tube 1 on mesh 15, as shown in the drawing, heating element 3 is energized to produce melting and vaporization of the chloride in the space enclosed by the copper mesh. A stream of hydrogen gas, which may be admixed with inert gas, is introduced through conduit 9 to contact and mix with the halide vapor. The pressure within tube 1 is maintained at about atmospheric pressure. During the vaporization of the chloride in the hydrogen gas stream, copper crystals 19, in the form of whiskers, begin to grow from the chloride vapor on to the copper mesh substrate 15. As shown in the drawing, the thickness of the wire in the mesh is less than that of the whiskers. Due to the benefit derived from the large surface area provided by the copper mesh substrate immediately adjacent the site of crystal growth, the copper whiskers, ultimately grow to a length of one-half inch or more with a substantial number of whiskers attaining a length of one inch or more. Reaction by-product vapors and any unreacted gaseous material exit from tube 1 through conduit 11. The formation of copper whiskers 19, e.g., filamentary single crystals, on the surface of the copper mesh is illustrated in FIGURE 2.

The polycrystalline copper mesh 15, or other polycrystalline copper substrate similarly having a large surface area immediately adjacent the site of crystal growth, is an essential feature of the present invention which provides for the production of large filamentary crystals having nearly theoretical strength. It is believed that the substantially increased area of polycrystalline copper adjacent to and in the vicinity of the growing crystals acts as an equilibrating agent and chemical sink for the excess by-product acid halide which, in previous crystal growing techniques, preferentially attacked the growing crystals thereby substantially preventing the formation of long whiskers, and also causing many of the crystals which were formed to be severed by re-chlorination and thus topple into the molten chloride.

Accordingly, in the practice of the present invention, the polycrystalline copper substrate is arranged to have an area sufficient to support the produced metal crystals and sufficient to serve as an equilibrating agent or chemical sink to thereby prevent destruction of the produced metal crystals by by-product halide.

It has been found that a rugged polycrystalline copper surface, e.g., a wire mesh, extending in the direction of the hydrogen-halide vapor flow, is especially suitable as a substrate by ensuring effective growth of large filamentary single crystals. Further improvement in filamentary crystal production is achieved when the polycrystalline copper substrate is arranged to substantially surround the flow of the hydrogen-halide vapor mixture.

A further advantage of using a copper mesh, or similarly rugged or uneven surface as a substrate is, that the liquid chloride which is initially placed thereon can, in effect, be spread out in a relatively restricted zone whereby it vaporizes at an increased rate in the hydrogen stream.

The operating temperature range which has been found to be most suitable for the production of long copper whiskers in the present process is that at which optimum single crystal growth occurs and is from about 400 to 630° C. The corresponding temperature range for the production of iron whiskers is from about 675 to about 700° C.

From the above description it is seen that a process is provided by the present invention in which relatively long filamentary metallic crystals having nearly theoretical strength are readily produced.

The Periodic Table referred to above is that which appears in Handbook of Chemistry, by N. A. Lange, 9th Ed., 1956, on pages 56 and 57.

What is claimed is:

1. A process for producing filamentary single crystals of a metal selected from Groups IB and VIII of the Periodic Table which comprises providing a metal-bearing vapor by heating and vaporizing a chloride of the selected metal in a hydrogen atmosphere at about atmospheric pressure; contacting a polycrystalline copper substrate with said metal-bearing vapor, thereby growing filamentary single crystals of the selected metal from said vapor mixture on said polycrystalline copper substrate.

2. A process for producing filamentary single crystals of a metal selected from Groups IB and VIII of the Periodic Table which comprises providing a metal-bearing vapor by heating and vaporizing a chloride of the selected metal in a hydrogen atmosphere at about atmospheric pressure; contacting a polycrystalline copper substrate with said metal-bearing vapor, thereby growing filamentary single crystals of the selected metal from said vapor mixture on said polycrystalline copper substrate.

3. A process for producing filamentary single crystals of copper which comprises providing a copper-bearing vapor by heating and vaporizing cuprous chloride in a hydrogen atmosphere at about atmospheric pressure in the temperature range of about 400 to 630° C.; contacting a polycrystalline copper substrate with said copper-bearing vapor, thereby growing filamentary single crystals of copper on said polycrystalline copper substrate.

4. A process for producing filamentary single crystals of iron which comprises providing an iron-bearing vapor by heating and vaporizing iron chloride in a hydrogen atmosphere at about atmospheric pressure in the temperature range of about 675 to 700° C.; contacting a polycrystalline copper substrate with said iron-bearing vapor, thereby growing filamentary single crystals of iron on said polycrystalline copper substrate.

References Cited in the file of this patent

UNITED STATES PATENTS

| | | |
|---|---|---|
| 2,754,259 | Robinson et al. | July 10, 1956 |
| 2,813,811 | Sears | Nov. 19, 1957 |
| 2,842,468 | Brenner | July 8, 1958 |
| 2,842,469 | Fullman et al. | July 8, 1958 |